United States Patent

Charlson

(10) Patent No.: US 6,672,412 B1
(45) Date of Patent: Jan. 6, 2004

(54) METHOD FOR OPERATING A VEHICLE HAVING TWO PROPULSION UNITS

(75) Inventor: David M. Charlson, Galloway, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 10/241,875

(22) Filed: Sep. 12, 2002

(51) Int. Cl.[7] ............................................. B62D 11/00
(52) U.S. Cl. ..................... 180/6.48; 180/6.5; 180/9.44
(58) Field of Search ....................... 180/6.44, 6.48, 180/6.5, 6.7, 9.1, 9.21, 9.44, 333; 280/774, 778; 701/50, 51

(56) References Cited

U.S. PATENT DOCUMENTS

| | | | |
|---|---|---|---|
| 3,786,689 A | | 1/1974 | Houk ............................ 74/471 |
| 4,932,831 A | | 6/1990 | White et al. ................. 414/732 |
| 5,033,000 A | | 7/1991 | Littlejohn et al. ...... 364/424.05 |
| 5,186,270 A | * | 2/1993 | West .......................... 180/6.62 |
| 5,350,033 A | | 9/1994 | Kraft ........................... 180/167 |
| 5,456,332 A | * | 10/1995 | Borenstein .................. 180/167 |
| 5,584,346 A | * | 12/1996 | Sakamoto et al. ............ 172/4.5 |
| 5,646,843 A | | 7/1997 | Gudat et al. ........... 364/424.012 |
| 6,076,619 A | * | 6/2000 | Hammer ...................... 180/6.48 |
| 6,095,268 A | | 8/2000 | Jones, Jr. ...................... 180/6.5 |
| 6,179,073 B1 | * | 1/2001 | Chhabra et al. .............. 180/9.1 |
| 6,283,220 B1 | * | 9/2001 | Carter .......................... 169/24 |
| 6,431,296 B1 | * | 8/2002 | Won ........................... 180/9.32 |
| 2002/0023788 A1 | | 2/2002 | Torrie et al. ............... 180/9.26 |

* cited by examiner

Primary Examiner—Lesley D. Morris
Assistant Examiner—L. Lum
(74) Attorney, Agent, or Firm—Thomas Hine LLP

(57) ABSTRACT

A method for operating a vehicle having variable-speed left-side and right-side propulsion units (such as, without limitation, a tracked vehicle having a left track powered by a left-track motor and a right track powered by a right-track motor). The left-side propulsion unit is controlled by a first output signal from a first manual controller (such as, without limitation, a left joystick). The right-side propulsion unit is controlled by a second output signal from a second manual controller (such as, without limitation, a right joystick). At least one of the first and second output signals is modified to create a substantially identical output signal for the first and second manual controllers when the first and second output signals are within a predetermined tolerance. The left-side and right-side propulsion units are controlled with the identical output signal when the first and second output signals are within the predetermined tolerance.

20 Claims, 2 Drawing Sheets

METHOD FOR OPERATING A VEHICLE HAVING TWO PROPULSION UNITS

The United States Government has certain rights to this invention pursuant to Navy contract number N39998-01-D-7058/DO0004.

TECHNICAL FIELD

The present invention relates generally to vehicles, and more particularly to a method for operating a vehicle having variable-speed left-side and right-side propulsion units.

BACKGROUND OF THE INVENTION

Vehicles having variable-speed left-side and right-side propulsion units include those having traction-type propulsion units and those having non-traction-type propulsion units. Non-traction-type propulsion units include, without limitation, left-side and right-side aircraft engines and left-side (meaning positioned more to the left side than the right side) and right-side (meaning positioned more to the right side than the left side) boat and submarine propellers and/or thrusters. Traction-type propulsion units engage a solid surface and include left-side and right-side wheel and motor units and left-side and right-side track and motor units. Tracked vehicles include military tanks, bulldozers, and small robotic vehicles (such as those used by police bomb squads).

It is known to remotely control a wheeled vehicle using left and right joysticks. Moving the left joystick forward/back controls the forward/back rotational speed of left-side front and rear wheels. Likewise, moving the right joystick forward/back controls the forward/back rotational speed of right-side front and rear wheels. It is difficult to precisely manually control the positions of the left and right joysticks to move the vehicle in a straight line. It also is known to control a tracked vehicle using a single joystick. What is needed is an improved method for operating a vehicle having variable-speed left-side and right-side propulsion units.

SUMMARY OF THE INVENTION

A first method of the invention is for operating a tracked vehicle having left and right tracks. The vehicle has a left-track motor adapted to provide variable-speed forward and reverse motion to the left track, and the vehicle has a right-track motor adapted to provide variable-speed forward and reverse motion to the right track. The left-track motor is controlled by a first output signal from a left joystick, and the right-track motor is controlled by a second output signal from a right joystick. The first method includes steps a) and b). Step a) includes modifying at least one of the first and second output signals to create a substantially identical output signal for the left and right joysticks when the first and second output signals are within a predetermined tolerance. Step b) includes controlling the left-track and right-track motors with the identical output signal when the first and second output signals are within the predetermined tolerance.

A second method of the invention is for operating a vehicle. The vehicle has a left-side traction unit adapted to provide variable-speed forward and reverse motion to the left side of the vehicle, and the vehicle has a right-side traction unit adapted to provide variable-speed forward and reverse motion to the right side of the vehicle. The left-side traction unit is controlled by a first output signal from a first manual controller, and the right-side traction unit is controlled by a second output signal from a second manual controller. The second method includes steps a) and b). Step a) includes modifying at least one of the first and second output signals to create a substantially identical output signal for the first and second manual controllers when the first and second output signals are within a predetermined tolerance. Step b) includes controlling the left-side and right-side traction units with the identical output signal when the first and second output signals are within the predetermined tolerance.

A third method of the invention is for operating a vehicle having variable-speed left-side and right-side propulsion units. The left-side propulsion unit is controlled by a first output signal from a first manual controller, and the right-side propulsion unit is controlled by a second output signal from a second manual controller. The method includes steps a) and b). Step a) includes modifying at least one of the first and second output signals to create a substantially identical output signal for the first and second manual controllers when the first and second output signals are within a predetermined tolerance. Step b) includes controlling the left-side and right-side propulsion units with the identical output signal when the first and second output signals are within the predetermined tolerance.

Several benefits and advantages are derived from one or more of the methods of the invention. Controlling the left-side and right-side propulsion units (such as left-side and right-side traction units such as left-track and right-track motors providing motion to respective left and right tracks) with a substantially identical output signal when the first and second output signals are within a predetermined tolerance moves the vehicle in a straight line despite differences (up to the predetermined tolerance) in the positions of the first and second manual controllers (such as left and right joysticks). Such control anticipates such differences (up to the predetermined tolerance) as indicating the user is trying to move the vehicle in a straight line.

DETAILED DESCRIPTION

Figure 1:
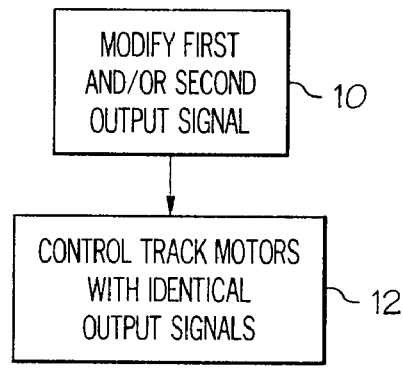
FIG. 1 is a block diagram of a first method of the invention for operating a tracked vehicle having left and right joysticks for controlling variable-speed forward and reverse motion of respective left and right tracks.

Referring to FIG. 1, a first method of the invention is for operating a tracked vehicle having left and right tracks. The vehicle has a left-track motor adapted to provide variable-speed forward and reverse motion to the left track, and the vehicle has a right-track motor adapted to provide variable-speed forward and reverse motion to the right track. The left-track motor is controlled by a first output signal from a left joystick, and the right-track motor is controlled by a second output signal from a right joystick. The method includes steps a) and b). Step a) is labeled as "Modify First And/Or Second Output Signals" in block 10 of FIG. 1. Step a) includes modifying at least one of the first and second output signals to create a substantially identical output signal for the left and right joysticks when the first and second output signals are within a predetermined tolerance. Step b)

is labeled as "Control Track Motors With Identical Output Signal" in block 12 of FIG. 1. Step b) includes controlling the left-track and right-track motors with the identical output signal when the first and second output signals are within the predetermined tolerance. In one implementation, steps a) and b) are performed only when the first and second output signals are within the predetermined tolerance.

Tracked vehicles include, without limitation, small robotic vehicles (such as those used by police bomb squads), bulldozers, and military tanks. In one arrangement of the first method, the more forward a joystick is positioned, the faster the track moves the vehicle in a forward direction, and the more rearward a joystick is positioned, the faster the track moves the vehicle in a reverse direction. In this enablement, no motion is imparted to the track when the joystick is positioned in a neutral position.

In a first example of the first method, the predetermined tolerance is a fixed number or percentage not dependent directly or indirectly on any joystick position. In a second example, the predetermined tolerance is a number or percentage which depends directly or indirectly on the position of one or both joysticks. In one variation of the second example, the predetermined tolerance is a smaller number or percentage at slower vehicle speeds and is a larger number or percentage at faster vehicle speeds. Other examples of the predetermined tolerance are left to the artisan.

In one enablement of the first method, the identical output signal has a value between and including the values of the first and second output signals. In one variation, the identical output signal has a value equal to the value of the greater (or the lesser) of the first and second output signals. In another variation, the identical output signal has a value equal to the average of the first and second output signals. Other choices for the identical output signal are left to the artisan.

In the same or a different enablement, the first method also includes the step of adjusting at least one of the first and second output signals in a predetermined manner to reduce the difference between the at-least-one output signal and the identical output signal when the first and second output signals come out of tolerance. This avoids abrupt changes in the first and/or second output signals due to the previous modification of step a) which created the identical output signal when the first and second signals went into tolerance. In one variation, the predetermined manner initially limits the difference and gradually reduces the limitation over a preselected time period. Other variations are left to the artisan.

In one employment of the first method, steps a) and b) are performed only when the first and second output signals indicate left track and right track motion in the same direction. In this employment, the vehicle is allowed to make a slow or fast turn in place since steps a) and b) are not performed when the first and second output signals indicate left and right track motion in opposite directions. In one construction, the left and right joysticks are substantially identical joysticks. In one implementation, a positive value of the first output signal signals the left-track motor to provide forward motion of a magnitude depending on the magnitude of the first output signal, and a negative value of the first output signal signals the left-track motor to provide reverse motion of a magnitude depending on the magnitude of the first output signal. In this implementation, the first method also includes the step of treating positive and negative values inside a dead-band range as zero values indicating the left-track motor is to provide no motion to the left track.

In one usage of the first method, the left and right joysticks remotely control the respective left-track and right-track motors. In one variation, the joystick output signals are sent by wireless transmission to the vehicle. In another variation, a wire carries multiplexed first and second output signals to the vehicle. In a different variation, separate wires carry the first and second output signals to the vehicle. In another usage, the left and right joysticks are onboard the vehicle as is the user.

In one illustration of the first method, the left and right joysticks are portions of a game pad such as an inexpensive game pad which is commercially available to play commercially-available video games. In one variation, the track vehicle includes a remotely-controlled non-track-motor device (such as, without limitation, a robotic arm or a camera), wherein the game pad has a device controller which controls the device. In this variation, the first method also includes the step of controlling the device with the device controller.

Figure 2:
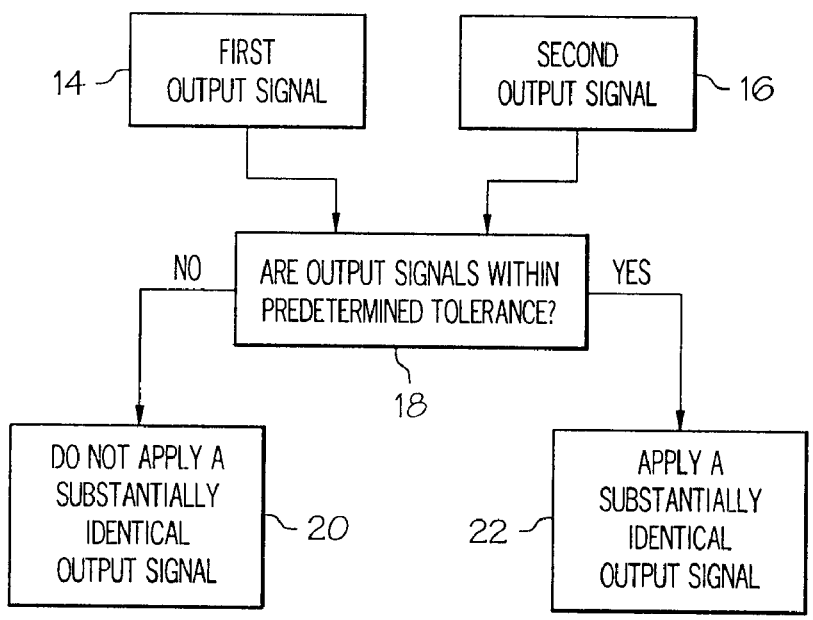
FIG. 2 is an explanatory diagram of one enablement of the decision making process involved in the first method of FIG. 1.

FIG. 2 illustrates one enablement of the decision making process involved in the first method of FIG. 1. In this enablement, a filter (or filtering algorithm such as, without limitation, the one discussed in the following paragraph) is imposed on the first and second output signals 14 and 16. Decision logic block 18 determines if the first and second output signals 14 and 16 are within the predetermined tolerance. If they are not within tolerance, the filter does not apply a substantially identical output signal to the left-track and right-track motors as indicated in block 20. If they are within tolerance, the filter applies the substantially identical output signal to the left-track and right-track motors as indicated in block 22. In one variation, the previously-described adjustment is made to the first and second output signals when they come out of tolerance. In another variation, no such adjustment is made when the first and second output signals come out of tolerance. In one application, the identical output signal is created only when the first and second output signals are within the predetermined tolerance, and the identical output signal is used to control the left-track and right-track motors when the first and second output signals are within the predetermined tolerance. In another application, the identical output signal is created when the first and second output signals are within or are without the predetermined tolerance, and the identical output signal is used to control the left-track and right-track motors when the first and second output signals are within the predetermined tolerance and the unmodified (adjusted or not as previously described) first and second output signals are used to control the respective left-track and right-track motors when the first and second output signals are outside the predetermined tolerance.

Figure 3:
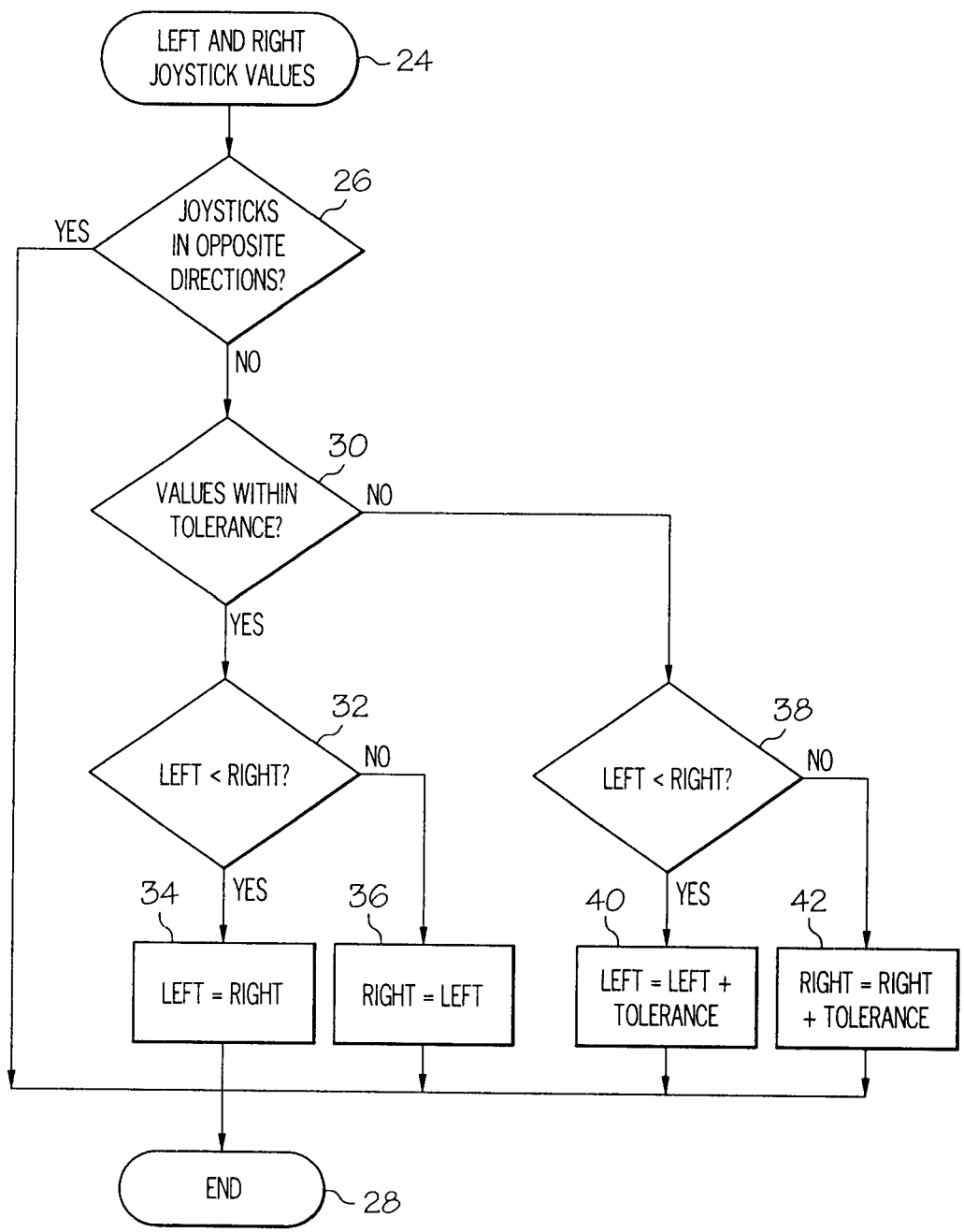
FIG. 3 is a block diagram of a joystick filtering algorithm used in one enablement of the first method of FIG. 1.

FIG. 3 is a block diagram of a joystick filtering algorithm used in one enablement of the first method of FIG. 1. Block 24 indicates that the values of the first and second output signals from the respective left and right joysticks are sent to decision block 26. Decision block 26 determines if the joysticks are in opposite directions. If the result of block 26 is "yes", the filtering algorithm ends as indicated by block 28, and the unmodified and unadjusted first output signal of the left joystick is used to control the left-track motor and the unmodified and unadjusted second output signal of the right joystick is used to control the right-track motor.

If the result of block 26 is "no", the filtering algorithm proceeds to block 30 which determines if the values of the left and right joystick signals are within the predetermined tolerance. If the result of block 30 is "yes", the algorithm proceeds to block 32 which determines if the value of the first output signal from the left joystick is less than the value of the second output signal from the right joystick. If the result of block 32 is "yes", the value of the first output signal of the left joystick is modified to be equal to the value of the second output signal of the right joystick (as indicated by block 34) resulting in an identical output signal for the left and right joysticks, the algorithm ends (as indicated by block 28), and the identical output signal is used to control the left-track and right-track motors. If the result of block 32 is "no", the value of the second output signal of the right joystick is modified to be equal to the value of the first output signal of the left joystick (as indicated by block 36) resulting in an identical output signal for the left and right joysticks, the algorithm ends (as indicated by block 28), and the identical output signal is used to control the left-track and right-track motors.

If the result of block 30 is "no", the algorithm proceeds to block 38 which determines if the value of the first output signal from the left joystick is less than the value of the second output signal from the right joystick. If the result of block 38 is "yes", the value of the first output signal of the left joystick is adjusted to be equal to its unadjusted value plus the predetermined tolerance (as indicated by block 40), the algorithm ends (as indicated by block 28), the adjusted value of the first output signal of the left joystick is used to control the left-track motor, and the unadjusted value of the second output signal of the right joystick is used to control the right-track motor. If the result of block 38 is "no", the value of the second output signal of the right joystick is adjusted to be equal to its unadjusted value plus the predetermined tolerance (as indicated by block 42), the algorithm ends (as indicated by block 28), the adjusted value of the second output signal of the right joystick is used to control the right-track motor, and the unadjusted value of the first output signal of the left joystick is used to control the left-track motor. The algorithm of FIG. 3 makes it easy for a user to move the vehicle in a straight line while still allowing precise turns while the vehicle is moving as well as allowing turns in place, as can be appreciated by those skilled in the art. Other joystick filtering algorithms are left to the artisan.

A second method of the invention is broader than the first method and is for operating a vehicle. The vehicle has a left-side traction unit adapted to provide variable-speed forward and reverse motion to the left side of the vehicle, and the vehicle has a right-side traction unit adapted to provide variable-speed forward and reverse motion to the right side of the vehicle. The left-side traction unit is controlled by a first output signal from a first manual controller, and the right-side traction unit is controlled by a second output signal from a second manual controller. The second method includes steps a) and b). Step a) includes modifying at least one of the first and second output signals to create a substantially identical output signal for the first and second manual controllers when the first and second output signals are within a predetermined tolerance. Step b) includes controlling the left-side and right-side traction units with the identical output signal when the first and second output signals are within the predetermined tolerance.

Vehicles having left-side and right-side traction units include, without limitation, tracked vehicles such as, without limitation, those tracked vehicles previously described in the first method and include non-track vehicles which engage a solid surface in traction to move the vehicle such as, without limitation, a vehicle having a left wheel powered by a left-wheel motor and a right wheel powered by a right-wheel motor. Manual controllers include the joysticks previously described in the first method and include non-joystick manual controllers such as, without limitation, a computer track ball, a computer mouse, a foot pedal, and a throttle stick. In one arrangement of the second method, the more forward a manual controller is moved, the faster the traction unit moves the vehicle side in a forward direction, and the more rearward a manual controller is moved, the faster the traction unit moves the vehicle side in a reverse direction. In this enablement, no motion is requested of the traction unit when the manual controller is positioned in a neutral position. In one arrangement, the left-side and the right-side traction units share a common motor, and in another arrangement they use separate motors. The examples, enablements, etc. of the first method are equally applicable to the second method as is understood by those skilled in the art.

A third method of the invention is broader than the second method and is for operating a vehicle having variable-speed left-side and right-side propulsion units. The left-side propulsion unit is controlled by a first output signal from a first manual controller, and the right-side propulsion unit is controlled by a second output signal from a second manual controller. The method includes steps a) and b). Step a) includes modifying at least one of the first and second output signals to create a substantially identical output signal for the first and second manual controllers when the first and second output signals are within a predetermined tolerance. Step b) includes controlling the left-side and right-side propulsion units with the identical output signal when the first and second output signals are within the predetermined tolerance.

Vehicles having variable-speed left-side and right-side propulsion units include, without limitation, those vehicles previously described in the first and second methods and include, without limitation, aircraft having left-side and right-side engines and boats and submarines having left-side and right-side propellers and/or thrusters. A left-side propulsion unit is a propulsion unit disposed more to the left side than the right side of the vehicle, and a right-side propulsion unit is a propulsion unit disposed more to the right side than the left side of the vehicle.

Several benefits and advantages are derived from one or more of the methods of the invention. Controlling the left-side and right-side propulsion units (such as left-side and right-side traction units such as left-track and right-track motors providing motion to respective left and right tracks) with a substantially identical output signal when the first and second output signals are within a predetermined tolerance moves the vehicle in a straight line despite differences (up to the predetermined tolerance) in the positions of the first and second manual controllers (such as left and right joysticks). Such control anticipates such differences (up to the predetermined tolerance) as indicating the user is trying to move the vehicle in a straight line.

The foregoing description of several methods of the invention has been presented for purposes of illustration. It is not intended to be exhaustive or to limit the invention to the precise procedures disclosed, and obviously many modifications and variations are possible in light of the above teaching. It is intended that the scope of the invention be defined by the claims appended hereto.

What is claimed is:

1. A method for operating a tracked vehicle having left and right tracks, wherein the vehicle has a left-track motor adapted to provide variable-speed forward and reverse motion to the left track, wherein the vehicle has a right-track motor adapted to provide variable-speed forward and reverse motion to the right track, wherein the left-track motor is controlled by a first output signal from a left joystick, wherein the right-track motor is controlled by a second output signal from a right joystick, and wherein the method comprises the steps of:

a) modifying at least one of the first and second output signals to create a substantially identical output signal for the left and right joysticks when the first and second output signals are within a predetermined tolerance, and b) controlling the left-track and right-track motors with the identical output signal when the first and second output signals are within the predetermined tolerance.

2. The method of claim 1, wherein the identical output signal has a value between and including the values of the first and second output signals.

3. The method of claim 2, wherein the identical output signal has a value equal to the value of the greater of the first and second output signals.

4. The method of claim 2, also including the step of adjusting at least one of the first and second output signals in a predetermined manner to reduce a difference between the at-least-one output signal and the identical output signal when the first and second output signals are not within the tolerance.

5. The method of claim 1, wherein steps a) and b) are performed only when the first and second output signals indicate left track and right track motion in a same direction.

6. The method of claim 1, wherein the left and right joysticks are substantially identical joysticks.

7. The method of claim 6, wherein a positive value of the first output signal signals the left-track motor to provide forward motion of a magnitude depending on the magnitude of the first output signal, wherein a negative value of the first output signal signals the left-track motor to provide reverse motion of a magnitude depending on the magnitude of the first output signal, and also including the step of treating positive and negative values inside a dead-band range as zero values indicating the left-track motor is to provide no motion to the left track.

8. The method of claim 1, wherein the left and right joysticks remotely control the respective left-track and right-track motors.

9. The method of claim 8, wherein the left and right joysticks are portions of a game pad.

10. The method of claim 9, wherein the track vehicle includes a remotely-controlled non-track-motor device, wherein the game pad has a device controller which controls the device, and also including the step of controlling the device with the device controller.

11. A method for operating a vehicle, wherein the vehicle has a left-side traction unit adapted to provide variable-speed forward and reverse motion to the left side of the vehicle, wherein the vehicle has a right-side traction unit adapted to provide variable-speed forward and reverse motion to the right side of the vehicle, wherein the left-side traction unit is controlled by a first output signal from a first manual controller, wherein the right-side traction unit is controlled by a second output signal from a second manual controller, and wherein the method comprises the steps of:

a) modifying at least one of the first and second output signals to create a substantially identical output signal for the first and second manual controllers when the first and second output signals are within a predetermined tolerance, and b) controlling the left-side and right-side traction units with the identical output signal when the first and second output signals are within the predetermined tolerance.

12. The method of claim 11, wherein the identical output signal has a value between and including the first and second output values.

13. The method of claim 12, wherein the identical output signal is the greater of the first and second output signals.

14. The method of claim 12, also including the step of adjusting at least one of the first and second output signals in a predetermined manner to reduce a between the at-least-one output signal and the identical output signal when the first and second output signals are not within the tolerance.

15. The method of claim 11, wherein steps a) and b) are performed only when the first and second output signals indicate left-side and right-side motion in a same direction.

16. The method of claim 11, wherein the first and second manual controllers remotely control the respective left-side and right-side traction units.

17. The method of claim 16, wherein the vehicle is a tracked vehicle having a left track and a right track, wherein the left-side traction unit includes the left track, and wherein the right-side traction unit includes the right track.

18. The method of claim 17, wherein the first manual controller includes a left joystick, and wherein the second manual controller includes a right joystick.

19. The method of claim 18, wherein the vehicle includes a remotely-controlled non-vehicle-traction device, wherein the left and right joysticks are portions of a game pad having a device controller which controls the device, and also including the step of controlling the device with the device controller.

20. A method for operating a vehicle having variable-speed left-side and right-side propulsion units, wherein the left-side propulsion unit is controlled by a first output signal from a first manual controller, wherein the right-side propulsion unit is controlled by a second output signal from a second manual controller, and wherein the method comprises the steps of:

a) modifying at least one of the first and second output signals to create a substantially identical output signal for the first and second manual controllers when the first and second output signals are within a predetermined tolerance, and b) controlling the left-side and right-side propulsion units with the identical output signal when the first and second output signals are within the predetermined tolerance.

* * * * *

UNITED STATES PATENT AND TRADEMARK OFFICE
CERTIFICATE OF CORRECTION

PATENT NO.   : 6,672,412 B1
DATED        : January 6, 2004
INVENTOR(S)  : David M. Charlson It is certified that error appears in the above-identified patent and that said Letters Patent is hereby corrected as shown below:

<u>Column 8,</u>
Line 18, insert -- difference -- before the word "between".

Signed and Sealed this

Sixteenth Day of March, 2004

JON W. DUDAS
*Acting Director of the United States Patent and Trademark Office*